United States Patent
Clark, II

(10) Patent No.: US 8,109,693 B1
(45) Date of Patent: *Feb. 7, 2012

(54) METHOD OF CUTTING TARGET MEMBERS USING A CUTTING SAW DEVICE

(75) Inventor: Galen R. Clark, II, Lafayette, LA (US)

(73) Assignee: Tetra Technologies, Inc., The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/084,726

(22) Filed: Apr. 12, 2011

Related U.S. Application Data

(63) Continuation of application No. 12/142,893, filed on Jun. 20, 2008, now Pat. No. 7,922,424.

(51) Int. Cl.
*E03F 3/06* (2006.01)

(52) U.S. Cl. ..... 405/156; 83/200.1; 83/307.1; 83/307.2; 83/651.1

(58) Field of Classification Search .......... 405/85, 405/156, 190, 191; 144/4.1; 125/16.02, 125/21; 83/200.1, 307.1, 651.1; 166/361
See application file for complete search history.

(56) References Cited

U.S. PATENT DOCUMENTS

| | | | |
|---|---|---|---|
| 2,150,381 A | 3/1939 | Lansing |
| 2,795,222 A | 6/1957 | Garrison |
| 3,056,267 A | 10/1962 | McRee |
| 3,479,830 A | 11/1969 | Ostarly |
| 3,578,233 A | 5/1971 | Meister et al. |
| 3,933,519 A | 1/1976 | Koch et al. |
| 4,109,480 A | 8/1978 | Sumner |
| 4,180,047 A | 12/1979 | Bertelson |
| 4,234,268 A | 11/1980 | Scodino |
| 4,765,307 A | 8/1988 | Kubo |
| 4,777,723 A | 10/1988 | Southoff |
| 4,787,363 A | 11/1988 | Kubo |
| 4,936,284 A | 6/1990 | Johnson |
| 5,044,827 A | 9/1991 | Gray et al. |
| 5,361,748 A | 11/1994 | Matteucci |
| 7,036,599 B2 | 5/2006 | Matteucci |
| 7,922,424 B2 * | 4/2011 | Clark, II ........... 405/156 |

OTHER PUBLICATIONS

Cutting Edge Services Corp., Apr. 2, 2009, http://cuttingedgeservices.com/metal-undersea.html.*

* cited by examiner

*Primary Examiner* — David Bagnell
*Assistant Examiner* — Benjamin Fiorello
(74) *Attorney, Agent, or Firm* — Garvey, Smith, Nehrbass & North, L.L.C.; Brett A. North

(57) ABSTRACT

A diamond wire saw and method provides a frame that includes a clamp that attaches to a target (e.g. piling, beam, tubular), an elongated toothed rack extending away from the mount and target, and a moving portion that carries the diamond wire and motor drives that advance the moving portion toward the target and along the toothed rack while driving the wire around roller guides.

20 Claims, 14 Drawing Sheets

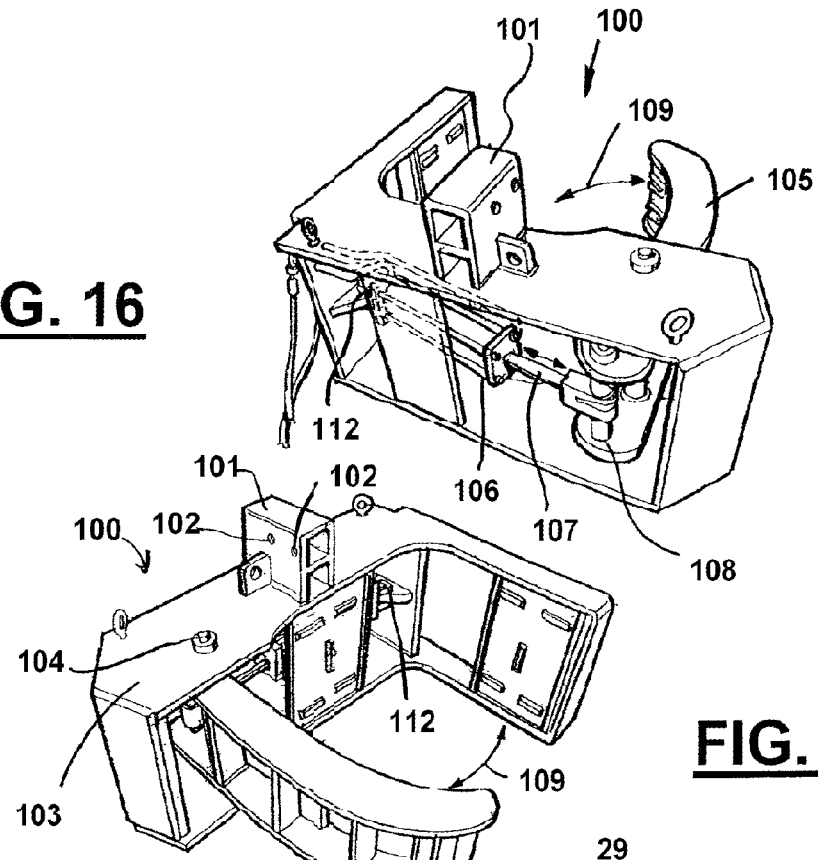
FIG. 16
FIG. 15
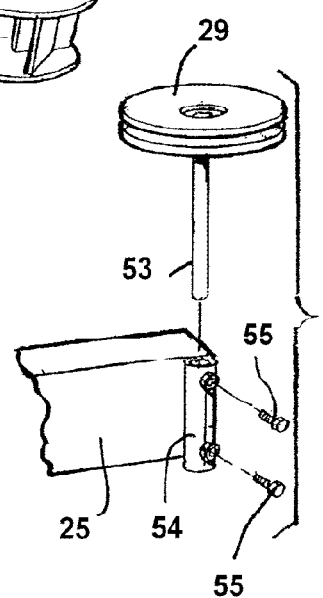
FIG. 14

METHOD OF CUTTING TARGET MEMBERS USING A CUTTING SAW DEVICE

CROSS-REFERENCE TO RELATED APPLICATIONS

This is a continuation of U.S. patent application Ser. No. 12/142,893, filed Jun. 20, 2008, (issuing as U.S. Pat. No. 7,922,424 on Apr. 12, 2011), which application is incorporated herein by reference. Priority of this application is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND

The present invention relates to the removal of targets (e.g. underwater tubular members) as a part of oil well intervention and decommissioning. More particularly, the present invention relates to a method and apparatus of cutting of targets above and below the water line such as tubular members associated with oil and gas well drilling platforms and production platforms. Even more particularly, the present invention relates to an underwater cutting method that provides cold-cutting of targets, tubular members, or "tubulars" using a specially configured diamond wire saw arrangement.

The following patents are directed to diamond wire saws and continuous wire saws as well as methods of cutting structures underwater.

SUMMARY

In one embodiment is provided an underwater cutting apparatus and method of compact size, lightweight and simple design.

In one embodiment is provided a cold-cutting saw device that employs two remotely controlled motors, preferably hydraulic motors mounted to a frame such as a lightweight aluminum frame.

In one embodiment one of the hydraulic motors propels or circulates a continuous loop of diamond wire (for example, 5/8 inches outer diameter) that is wound about a series of alignment wheels or sheaves. In one embodiment the cutting diamond wire can travel at a rate of between about 20 and 25 feet per second as an example.

In one embodiment is provided a second motor drive moves a pinion gear of a rack and pinion mechanism. This rack and pinion mechanism moves a part of the frame along a feed shaft (for example, composite or steel). The movement of part of the frame pushes or pulls the circulating diamond wire into and through the target material or tubular as it is cut.

In one embodiment the feed shaft can contain the teeth of the rack, and the feed shaft can support the weight of the saw frame. The feed shaft can also stabilize the cutting wire, maintaining the cutting wire in a constant plane that is generally normal to a mounting clamp and the material being cut.

In one embodiment a mounting clamp can be used to secure the entire saw assembly to the target or tubular or other material being cut utilizing a chain and binder or hydraulic clamping system.

In one embodiment the saw device can be used underwater, above water, and/or in dangerous to human environments, such as in nuclear reactors.

In one embodiment the saw device can be used to cut various combinations of solid and tubular dissimilar steels, synthetic composite materials, or dissimilar aggregates (concrete).

In one embodiment the saw device can be used to cut different size materials ranging from about two inches to about ninety-six inches in diameter as the target.

One embodiment includes a single, centralized feed shaft controllably slidable over a rack and pinion feeds mechanism which controls the feed and/or retraction amount/rate of the cutting diamond wire.

One embodiment includes a centralized feed shaft which has two longitudinal arms each longitudinal arm having a feed shaft controllably slidable over a rack and pinion feeds mechanism which controls the feed and/or retraction amount/rate of the cutting diamond wire. In this embodiment two feed motors and gears can be used to control feed and/or retraction of the cutting wire.

One embodiment includes a rectangular or square feed shaft for stabilizing the saw and maintaining the cutting wire perpendicular to a positioning clamp during cutting movements of the cutting wire.

In one embodiment the cutting saw frame is generally U-shaped allowing both a pushing type cut for the cutting wire and a pulling type cut for the cutting wire.

In one embodiment a plurality of alignment wheels or sheaves are arranged symmetrically on the saw frame to provide uniform tension to the cutting wire during operation.

In one embodiment one or more of the alignment wheels or sheaves have motion indicating indicia depicting movement of the cutting wire. In one embodiment one or more of the alignment wheels or sheaves have a rotating surface which includes a plurality of indicia markings. In one embodiment one or more of the alignment wheels or sheaves include a surface which is of two colors. In one embodiment one or more of the alignment wheels or sheaves are about 50 percent one color and 50 percent another color. The cutting indicia on the one or more alignment wheels or sheaves as they spin provides a visual indicator of when the cutting wire is in motion. In one embodiment the speed of rotation of the indicia on the alignment wheels or sheaves provides a visual indicator of the relative speed of the cutting wire.

In one embodiment the saw device can include a wire tensioning system which has an axial feed for the tension system. In one embodiment the axial feed tensioning system can be manually operated.

In one embodiment the cutting saw can include a cutting coolant system for providing lubricating and/or cooling liquids on the wire during cutting operations. In one embodiment the cooling system can include one or more spray nozzles.

In one embodiment the saw device can include a platform design for saw sizes to cut materials from 2" OD and greater. In one embodiment the saw device can be sized from a 26" cutting area to a 100" cutting area. In one embodiment a single man portable version of the saw device can be provided having a relatively small opening (such as 14 inches) for single man operations (e.g., where one man can easily lift and position the cutting while above water).

In one embodiment the saw device can be mounted on the target and clamped in place using a remote operated vehicle ("ROV") and the saw device being controlled remotely from the surface, or the saw can be operated independently utilizing the hydraulic system integrated into many ROV systems with its full control under the command of the ROV operator. In this embodiment the cutting saw can include a remote operated clamping system (such as a hydraulic clamp). The ROV will have the cutting saw with the remote operated clamping system attached to the ROV, and the ROV will position the cutting saw at the place of cut on the target, and the clamping system will be activated remotely causing the saw to attach to the target, and the cutting saw will be remotely activated causing the cutting wire to spin. The cutting wire will be remotely moved forward by the topside operator and the cut made similar to operations under other embodiments. However, the ROV will remain attached to the cutting saw during and after the cut is made. After the cut is made the ROV can bring the cutting saw to the surface or can bring the cutting saw to the next target to be cut.

In one embodiment the saw device can include a bulkhead for the placement of "hot stab" hydraulic connections for use with ROV systems.

In one embodiment the saw device can include a flotation system. In one embodiment this floatation system can be one or more modules of syntactic foam. In one embodiment the floatation system provides about neutral buoyancy to the saw device. In one embodiment the floatation modules can be attached to the saw and/or mounted inside void spaces of the saw. In one embodiment buoyancy modules are used in combination with ROV operations. In one embodiment buoyancy modules are used to assist diver handling, positioning, and placement of the saw device.

In one embodiment lifting sling attach points allow the use of quick release shackles to speed diver and/or ROV manipulation during saw device mounting to the target material.

In one embodiment the cutting saw apparatus can include an emergency shutoff system. In one embodiment a remotely operated emergency shutoff system can be connected to the cutting saw. In one embodiment the remote shutoff can be remote from an operator's shutoff for the cutting saw. In one embodiment this remote shutoff can be under the control of a Dive Supervisor or Customer Representative.

In one embodiment the saw device can be mounted to the target piece either manually such as with a manual clamp (e.g., a chain and come-along). In one embodiment the saw device can be mounted to the target piece using a hydraulic clamping system.

In one embodiment the saw device can include a mounting bracket for one or more underwater lights along with one or more cameras for visual monitoring at the surface. In one embodiment cutting operations can be visually recorded on the surface using a video monitoring system such as a video camera. In one embodiment a fiber optic cable can be used to transmit the video signal from the camera to the surface.

In one embodiment the operator of the saw device can be above water and the saw device be below water. In one embodiment the operator can use the resistance on the cutting wire to determine when to advance the cutting wire of the saw device. In one embodiment the resistance on the cutting wire can be relatively determined based on the back pressure (e.g., hydraulic back pressure) to the driving motor for the cutting wire. In one embodiment the cutting process includes the step of advancing the cutting wire a short distance, and watching the resistance on the cutting wire increase and then over time decrease (as the cut on the target is made), and after noting the decrease in wire resistance, again advancing the cutting wire and watching the resistance on the cutting wire again increase. In one embodiment these two steps of advancing the cutting wire a short distance, and watching the resistance on the cutting wire first increase and then decrease before again advancing the cutting wire are repeated a plurality of times until the cut is made through the target.

In one embodiment the operator of the saw device can advance the cutting wire until a specified resistance is seen on the cutting wire. At this point the operator can decrease the feed rate until the resistance on the cutting wire decreases. Upon decrease of the resistance to the cutting wire the operator can again increase the feed rate of the cutting wire. This feed rate adjusting process can be repeated until the cut is completed.

In one embodiment one or more of the alignment wheels or sheaves can be replaced while the saw device is underwater, such as during the middle of a cut and without moving the saw device above water.

In one embodiment the wire can be replaced while the saw device is underwater, such as during the middle of a cut and without moving the saw device above water.

In one embodiment while underwater after a first cutting wire has broken a second cutting wire can be placed on the saw device and properly tensioning without having to first return the saw device to the surface. In one embodiment the axial feed wire tensioning system can be used to properly tension the cutting wire while the saw device remains underwater.

In one embodiment the method includes the steps of:
  (a) starting a cut with a pushing (or pulling) type cut;
  (b) before the cut is completed, stopping the cutting wire and at least partially removing the cutting wire from the alignment wheels or sheaves;
  (c) moving the saw device into a different pulling (or pushing) type cut position but without bringing the cutting saw above;
  (d) placing cutting wire on the alignment wheels or sheaves; and
  (e) completing the remaining portion of the cut in the other type of cutting mode.

In one embodiment step "c" is completed without repositioning the clamp holding the cutting saw on the target.

In one embodiment step "c" is performed by moving the cutting frame to a substantially extended position. In one embodiment the cutting frame is moved to a completely extended position.

In one embodiment step "c" is performed by moving the cutting frame to a substantially retracted position. In one embodiment the cutting frame is moved to a completely retracted position.

In one embodiment the same cutting wire is used during steps "a" and "e."

In one embodiment a different cutting wire is in step "e" as that used in step "a".

In one embodiment the cutting wire used in step "a" is a loop which is broken into a wire string with two ends and during step "d" the two ends are reconnected to form a loop.

In one embodiment the cutting wire used in step "a" remains in a loop and is placed around the target being cut before step "d".

In one embodiment the tensioning mechanism is used to loosen the cutting wire in step "b."

In one embodiment the tensioning mechanism is used to tension the cutting wire in step "d."

In one embodiment the method includes the steps of:
  (a) starting a cut with a pushing (or pulling) type cut;
  (b) before the cut is completed, the first cutting wire breaking;
  (c) removing the first cutting wire from the alignment wheels or sheaves;

(d) without bringing the cutting saw above water installing a second cutting wire on the alignment wheels or sheaves;

(e) adjusting the wire tension on the second cutting wire; and (f) completing the remaining portion of the cut with the second cutting wire.

In one embodiment the tensioning mechanism is used to loosen the first cutting wire in step "c."

In one embodiment the tensioning mechanism is used to tension the second cutting wire in step "d."

In one embodiment the method includes the step of vertically adjusting at least one of the alignment wheels or sheaves while the cutting saw remains underwater.

In one embodiment when cutting a target (such as multiple strings of ungrouted casing) where binding of the cutting wire can occur after cutting just over one-half of the way through the target. The cutting wire can be moved to the outside of the target, and without changing the clamp position, complete the cut by pulling the diamond wire through the remaining cut zone of the target material.

In one embodiment the cold-cutting saw device of the present invention can be used in a subsea environment and top side. The cutting saw of the present invention can be remotely operated. The remote operation can be monitored via saw mounted camera or cameras. The present invention can be adapted for use with remotely operated vehicles or ROV's.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 14 is a fragmentary perspective view illustrating the installation of an alignment wheel or sheave and schematically indicating its installation and/or vertical adjustment;

FIG. 15 is a front perspective view of an alternate hydraulic clamping arrangement;

FIG. 16 is a rear perspective view of the hydraulic clamp of FIG. 15;

DETAILED DESCRIPTION OF THE INVENTION

Figure 1:
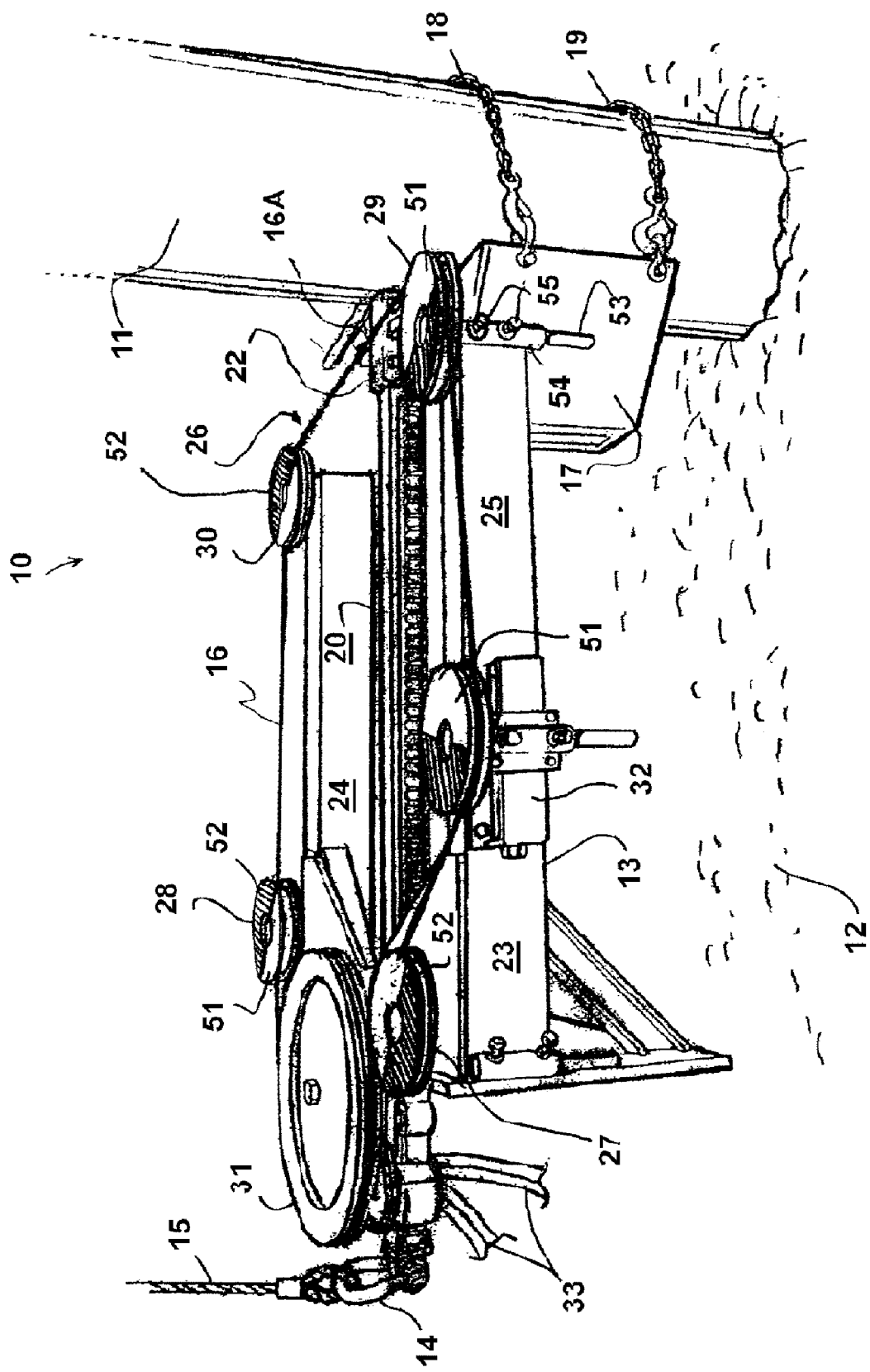
FIG. 1 is a perspective view of one embodiment of the apparatus.

FIGS. 1-23 show the preferred embodiment of the apparatus of the present invention, designated generally by the numeral 10. Cutting apparatus 10 can be used to cut a target 11 which can be a tubular, piling, steel beam, or other underwater structure that is to be cut. Often, such targets 11 are cut as part of oil well intervention and decommissioning activities. In a preferred embodiment, the apparatus 10 of the present invention can be used in a subsea environment for subsea cutting of target 11 at or near the seabed 12, or below the seabed 12 after an area around the target has been excavated to provide room for the cutting saw to operate. If an area around the target has been excavated a retaining wall or cofferdam can be used to resist filling of the opened space around the target.

Figure 2:
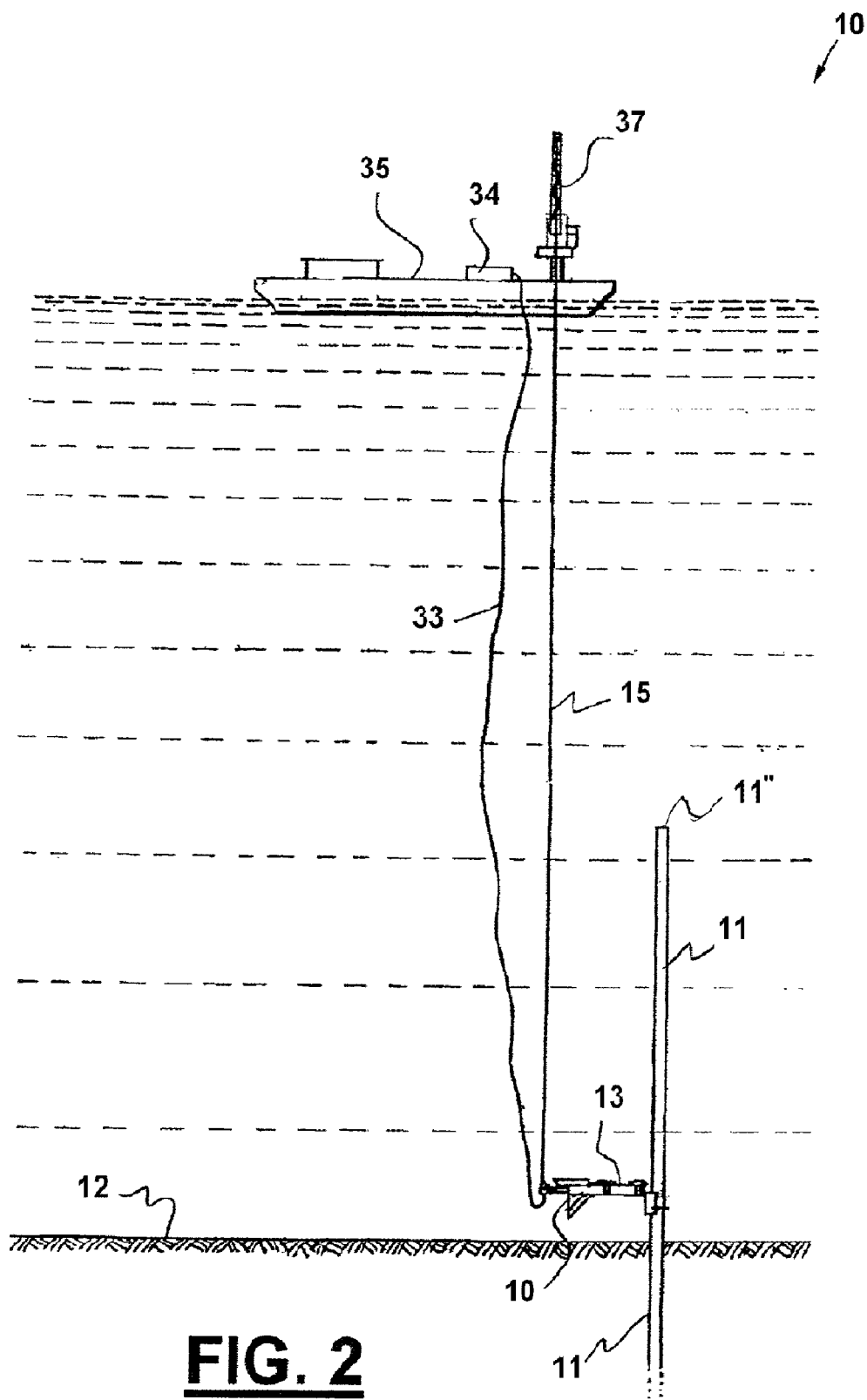
FIG. 2 is side elevation view showing the cutting saw of FIG. 1 attached to a target before making a cut.
Figure 13:
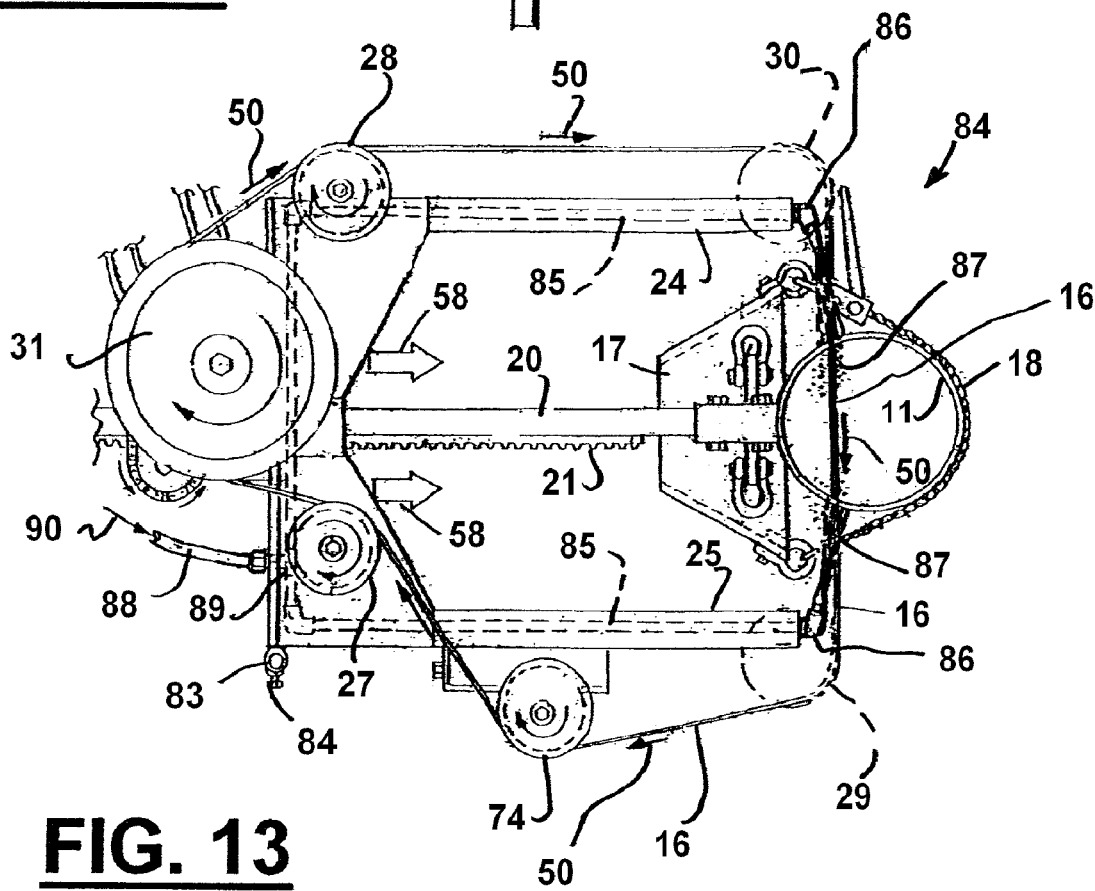
FIG. 13 is a plan view of the cutting saw of FIG. 1 during cutting and illustrating the cooling system.

Cutting apparatus 10 can be employed to cut a target for above water cutting when fitted with optional cooling system (FIG. 13). Cutting apparatus 10 employs a frame 13. The frame 13 can be supported with rigging such as shackles 14 and lift cables 15. In FIGS. 1 and 2, frame 13 is attached to target 11 using mounting clamp 17. The mounting clamp 17 can be attached to the target 11 using cable/chain attachments 18, 19, or a hydraulic clamp (see FIGS. 15-16).

A feed shaft 20 extends from mounting clamp 17 as shown in FIG. 1. The mounting clamp 17 can provide a receiver 22 that enables attachment of feed shaft 20 to mounting clamp 17 using a pin connection (with a quick release snap ring), bolted connection, or other connection. Feed shaft 20 is an elongated linear member having a toothed rack 21.

Frame 13 includes mounting clamp 17, feed shaft 20 and moving portion or section 23. Moving portion 23 includes transverse section 60 and arms 24, 25 which are spaced apart. Arms 24, 25 can be generally parallel. An open end 26 is provided to moving portion 23 in between arms 24, 25 generally opposite drive roller 31. Moving portion 23 provides sleeve 61 at transverse section 60. Sleeve 61 is receptive of feed shaft 20 and forms a sliding connection therewith.

Figure 6:
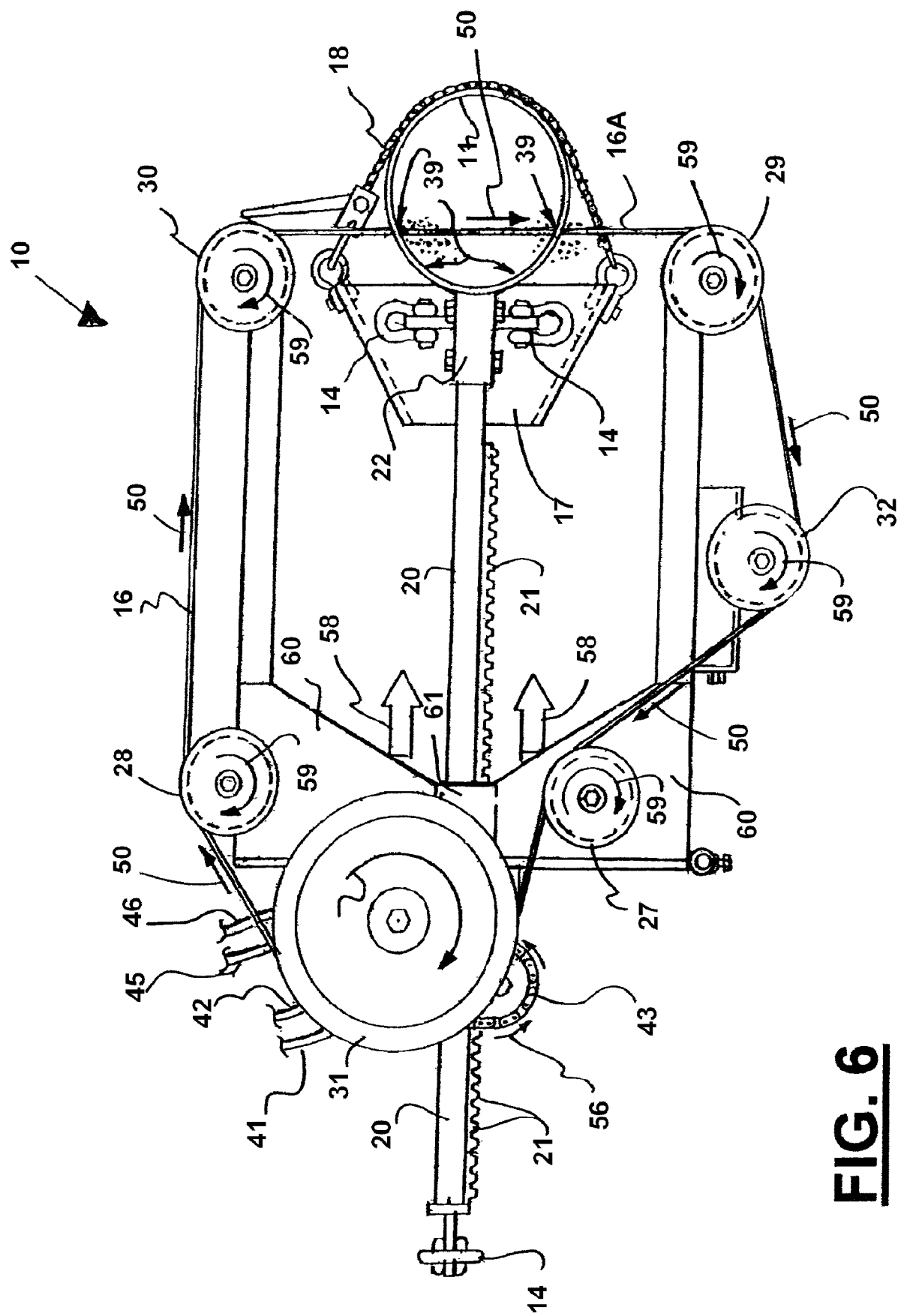
FIG. 6 is a top view of the cutting saw of FIG. 1 attached to a cutting target where the frame is partially extended making a cut on the cutting target.
Figure 7:
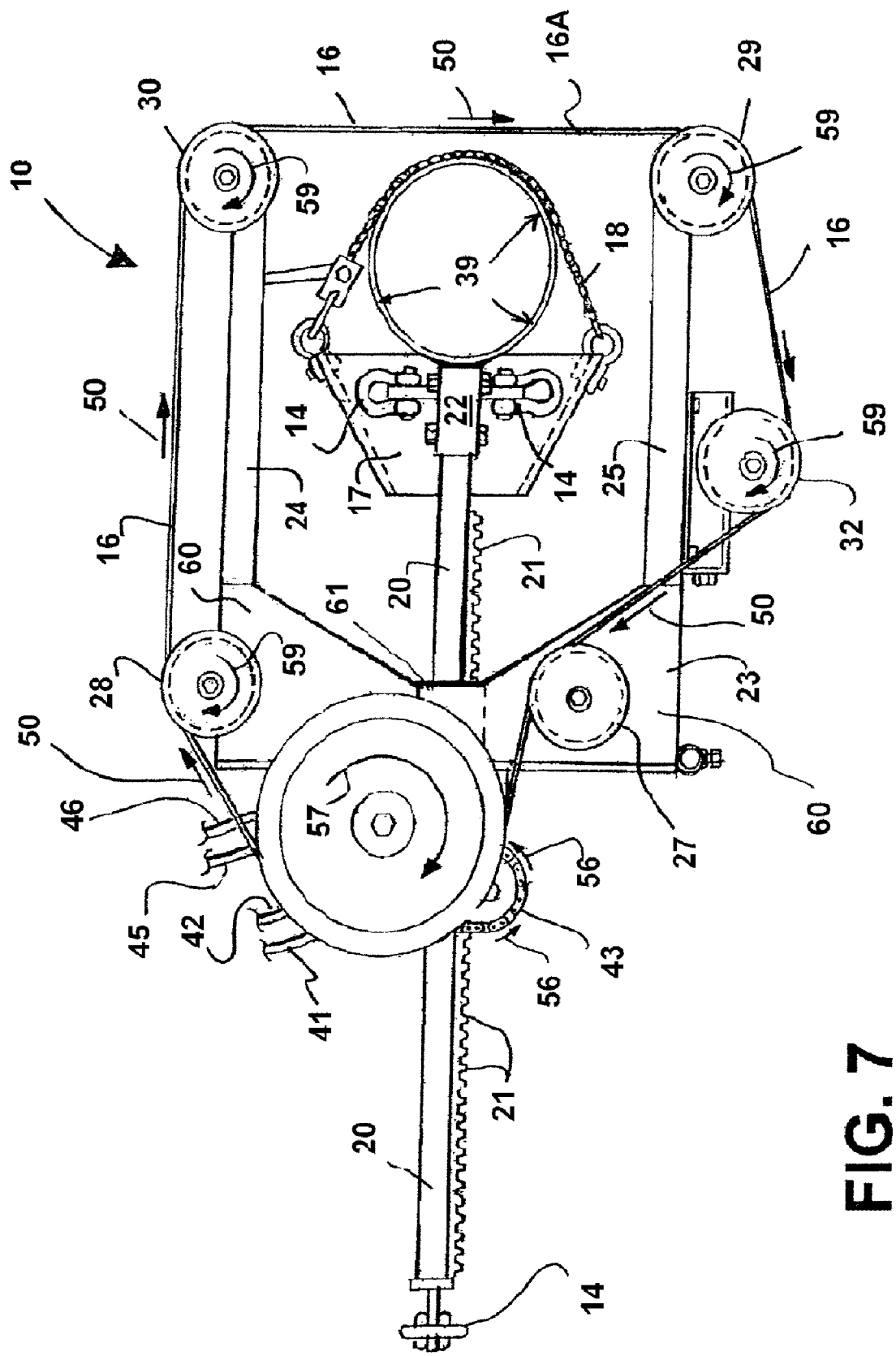
FIG. 7 is a top view of the cutting saw of FIG. 1 attached to a cutting target where the frame is fully extended and has completed the cut on the cutting target (and in the position shown in FIG. 3)
Figure 8:
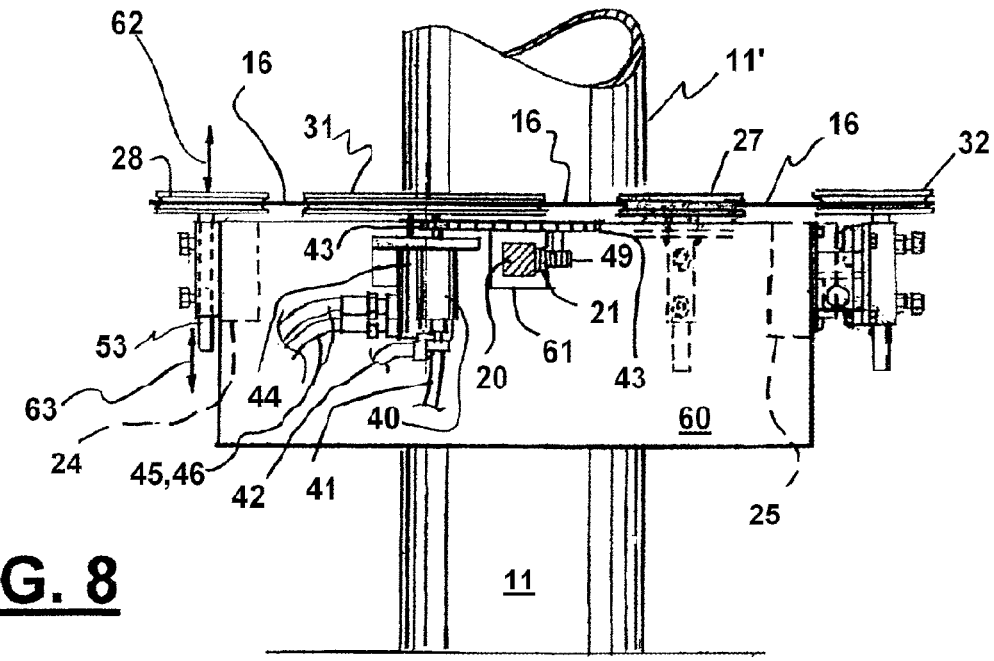
FIG. 8 is a rear view of the cutting saw of FIG. 1.

A plurality of sheaves or roller guides 27-30 are mounted to moving portion 23. A tensioner 32 is mounted to moving portion 23 and includes roller guide 74. An endless diamond wire 16 is wound about the roller guides/sheaves 27-30, drive roller 31 and tensioner 32 roller guide 74 as shown. Larger diameter roller 31 is a drive roller 31 drives diamond wire 16 clockwise when viewed in plan (see FIG. 6), as indicated schematically by arrows 50. Rollers 27-30 can rotate in the directions illustrated by arrows 59 in FIGS. 6-7 (rotation in the opposite directions is also available). Arrow 57 shows the direction of rotation of drive roller 31. Arrow 58 in FIG. 6 shows the direction of travel of moving portion 23 in relation to feed shaft 20. Arrow 56 shows the direction of rotation of roller 74 of tensioner 32.

Rollers 27-30 can be painted or marked to divide each roller 27-30 into semi-circular areas 51-52 of different color and thus easily show rotational movement during operation, such as when viewed with a remote, underwater camera 81. Each roller 27-30 is removable from moving section 23 for ease of replacement. Each roller 27-30 rotates upon a vertical shaft 53, which rotation can be facility by one or more bearings such as two sets of 3 centimeter stainless steel sealed bearings. Each shaft 53 is held in vertical tube 54 with one or more set screws 55. Set screws 55 enable replacement of a selected roller 27-30 and its shaft 53 as well as vertical adjustment (see arrows 62, FIG. 8) by loosening set screws 55. Set screws 55 can be tightened when a selected roller 27-30 and shaft 53 is located at the proper vertical elevation.

Support vessel 35 at water surface 36 can provide a crane 37 that lifts and lowers cable 15 and any needed rigging (e.g. slings). Hydraulic fluid supply lines 33 are provided for supplying hydraulic fluid from support vessel 35 and hydraulic control unit 34 to hydraulic motor drives 40, 44.

Figure 3:
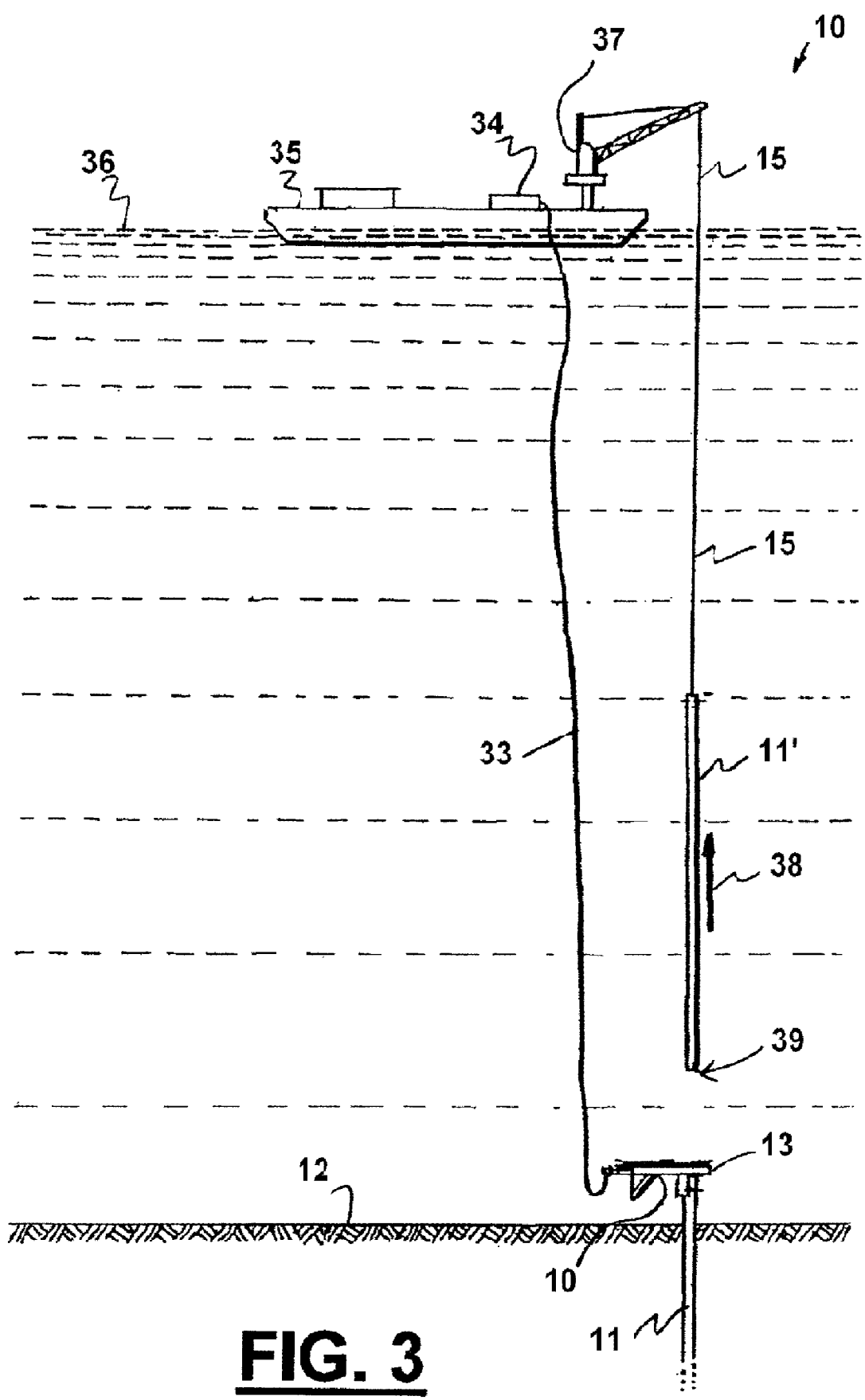
FIG. 3 is another elevation view showing the cutting saw of FIG. 1 after making a cut and the target being lifted by a vessels crane.
Figure 4:
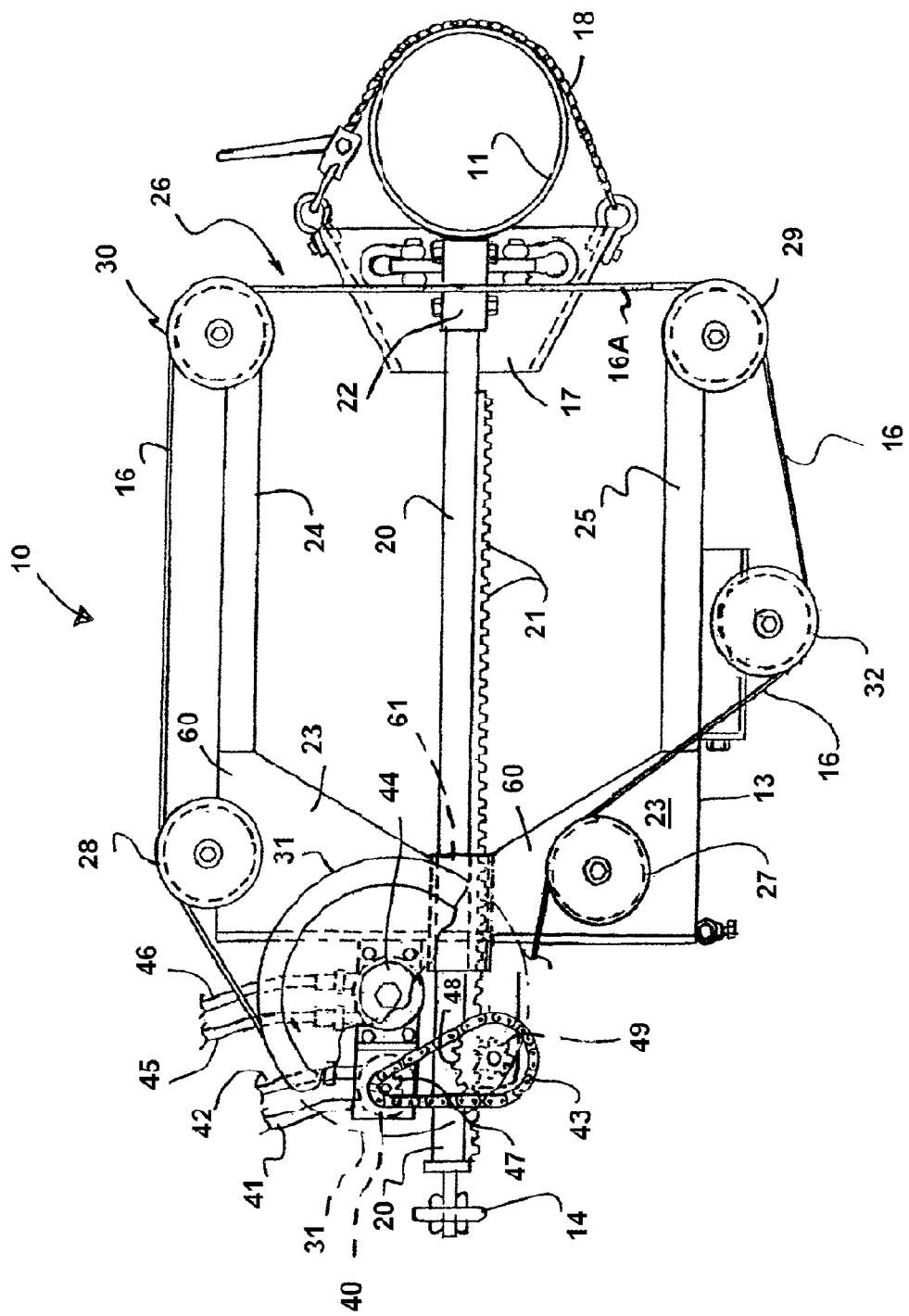
FIG. 4 is a top view of the cutting saw of FIG. 1 attached to a cutting target where the frame is completely retracted.
Figure 5:
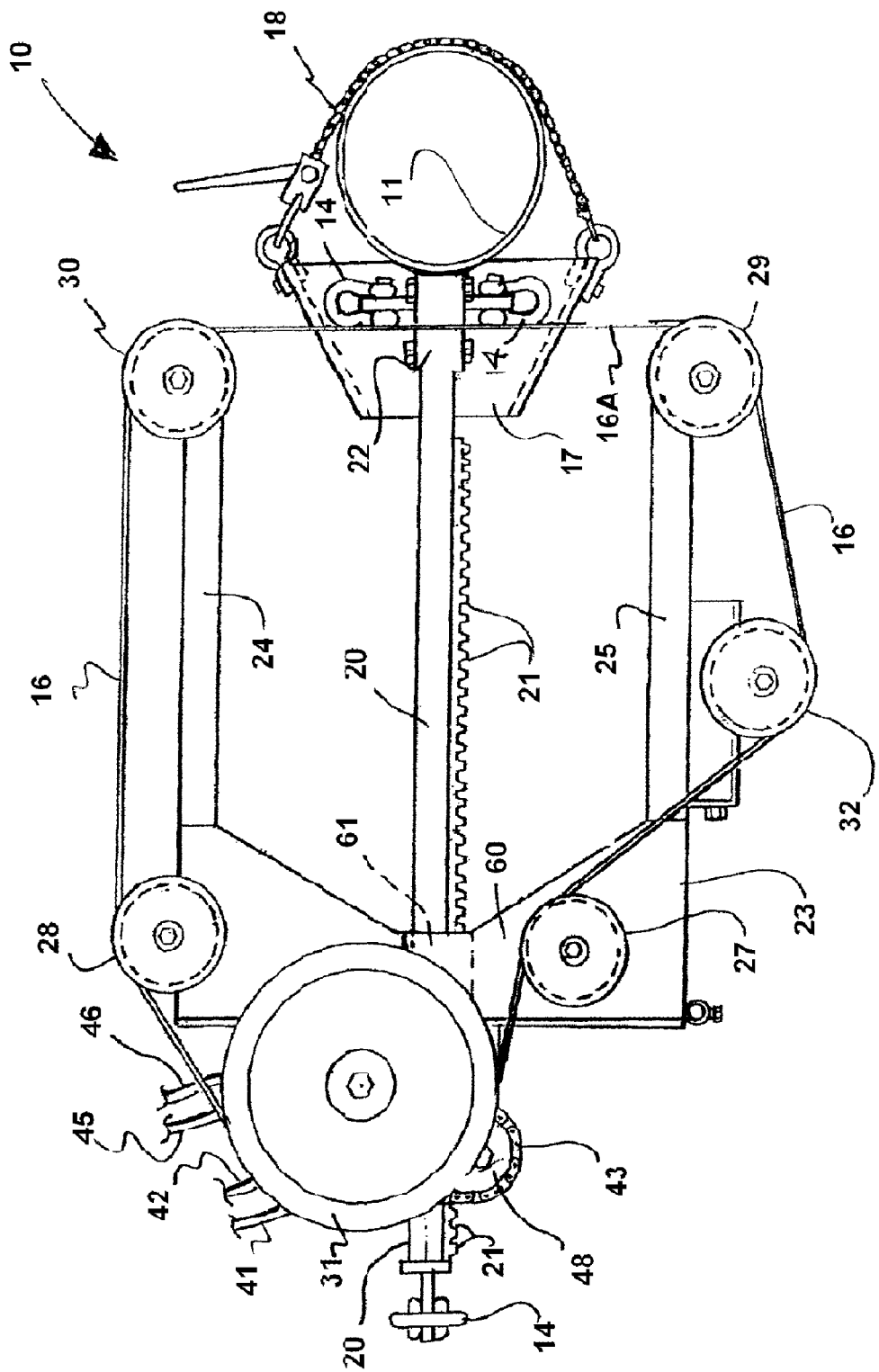
FIG. 5 is a top view of the cutting saw of FIG. 1 attached to a cutting target where the frame is partially extended but before starting a cut on the cutting target.

The apparatus 10 of the present invention can be remotely operated underwater from a vessel 35. Support vessel 35 can provide a hydraulic control unit 34 that enables remote operation of cutting apparatus 10. Arrow 38 in FIG. 3 illustrates the lifting of a section of structure or tubular or target 11 after it has been cut using cutting apparatus 10 at cut 39.

A pair of motor drives 40-44 are each provided with hydraulic flow lines. These hydraulic flow lines are a part of the hydraulic fluid supply 33. The motor drive 40 is provided with hydraulic lines 41, 42. The motor drive 44 is provided with hydraulic lines 45, 46. Motor drive 44 powers drive roller 31. Motor drive 40 powers pinion gear 49. The motor drive 40 powers smaller gear 47 which powers larger gear 48 using belt drive 43. Pinion 49 is attached to larger gear 48 and rotates therewith. The pinion 49 engages toothed rack 21 of feed shaft 20.

Figure 9:
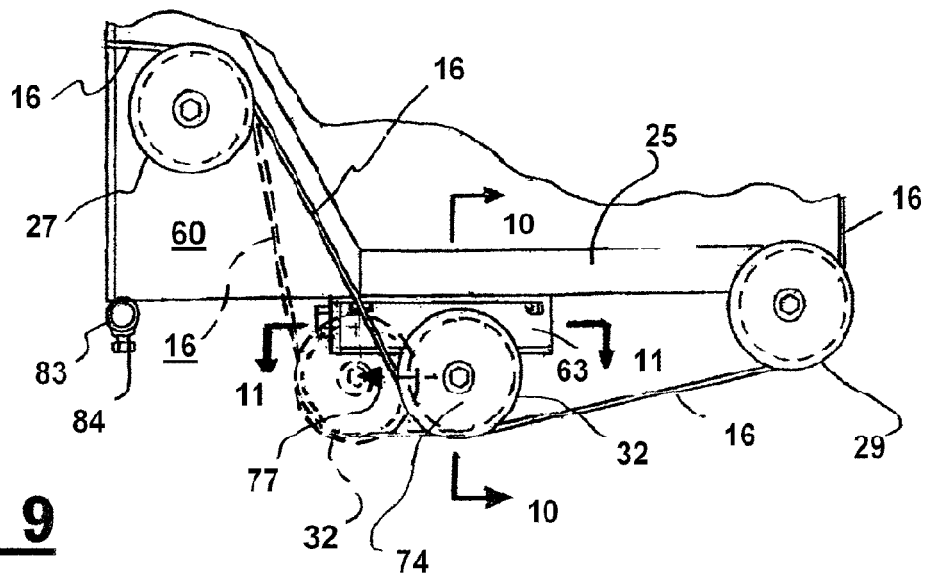
FIG. 9 is a fragmentary plan view of the cutting saw of FIG. 1 showing the tensioning apparatus.
Figure 10:
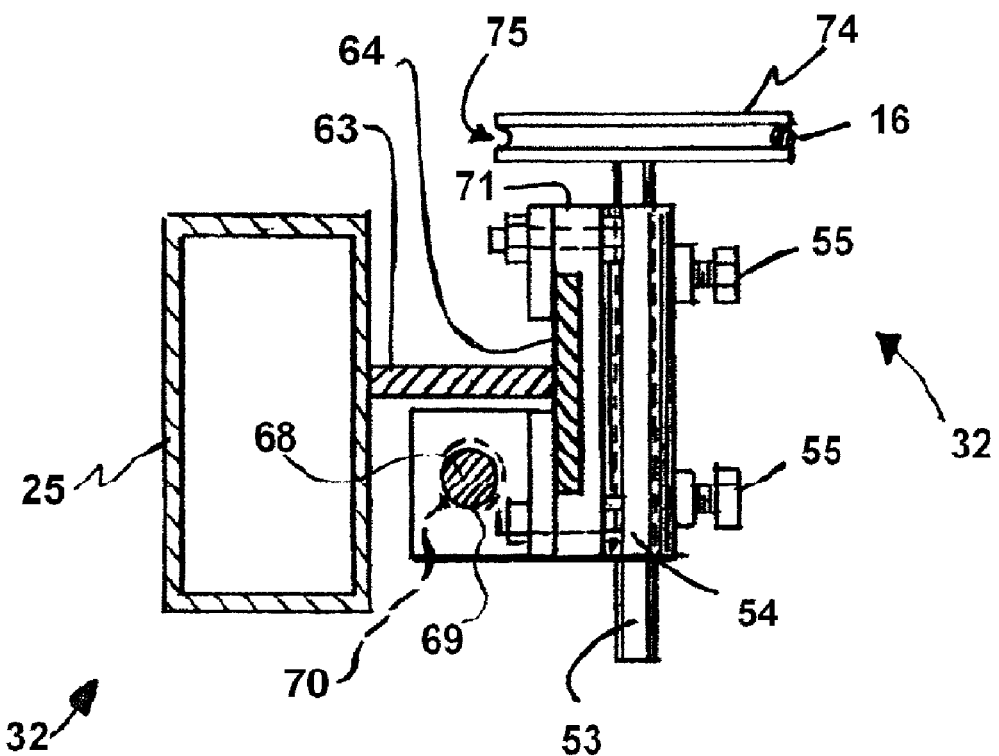
FIG. 10 is a fragmentary view taken along lines 10-10 of FIG. 9.
Figure 11:
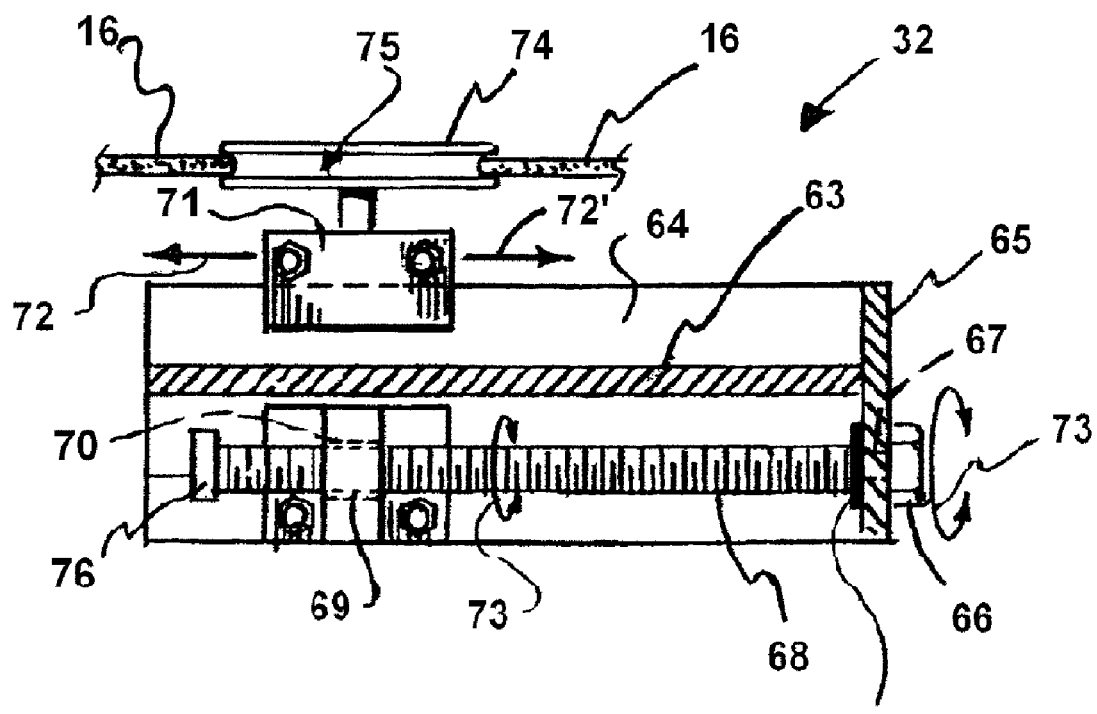
FIG. 11 is a fragmentary view taken along lines 11-11 of FIG. 9.

FIGS. 9-11 show the tensioning mechanism 32 in more detail. The tensioning mechanism 32 employs a t-shaped beam that includes web 63 and flange 64. End plate 65 is attached to web 63 flange 64 as shown in FIG. 11. A threaded rod 68 is mounted to end plate 65 at opening 67. Threaded rod 68 also attaches to nut 69 at internally threaded opening 70. Adjustment head 66 attaches to and rotates with threaded rod 68. A rotation of rod 68 using adjustment head 66 in the direction of arrows 73 in FIG. 11 effects a sliding movement of bearing/slide 71 as illustrated by arrows 72 and 72' in FIG. 11. This adjustment of adjustment head 66 to effect a movement of slide 71 changes the position of tensioner 32 roller 74 as shown in FIG. 9. By moving the roller 74 in FIG. 9 from the position shown in hard lines to the position shown in phantom lines, tension can be applied to diamond wire 16 as indicated by arrow 77 in FIG. 9. Roller 74 provides an annular groove 75 that is receptive of diamond wire 16 as shown in FIGS. 10 and 11. An annular flange or stop 76 can be provided at the end portion of threaded rod 68 opposite adjustment head 66 for limiting the travel of slide/bearing 71 away from end plate 65. A flange 66' (e.g., washer) can be welded on rod 68 to limit movement of rod 68 in the direction of arrow 72'.

Figure 12:
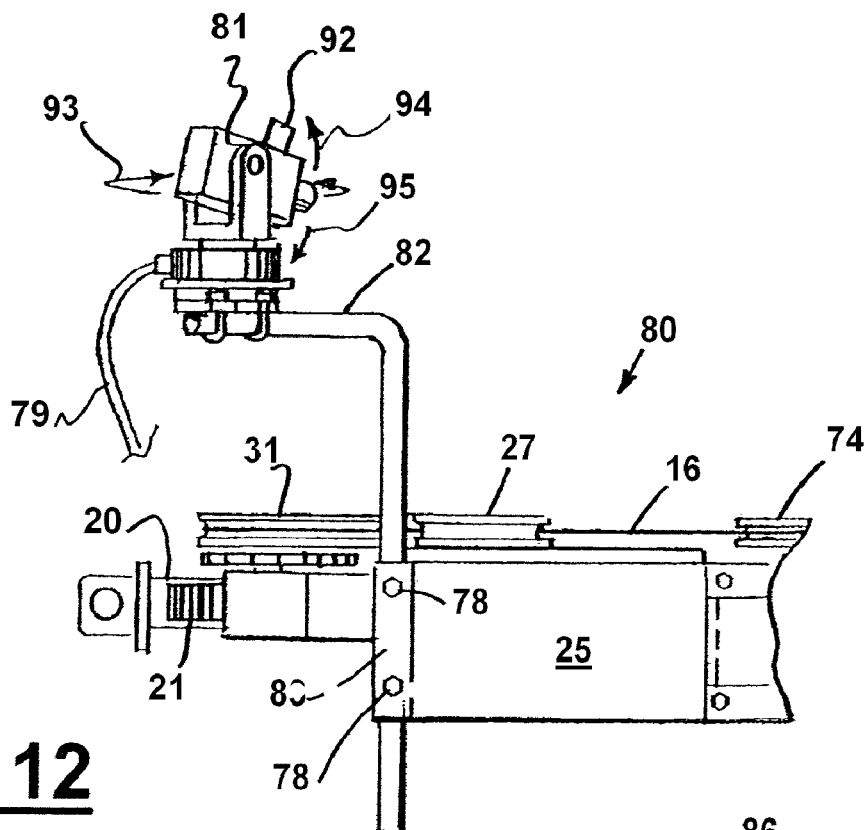
FIG. 12 is a fragmentary elevation view of the cutting saw of FIG. 1 showing a positionally controllable video camera mounted on the cutting saw (with the option of adding a light)
Figure 19:
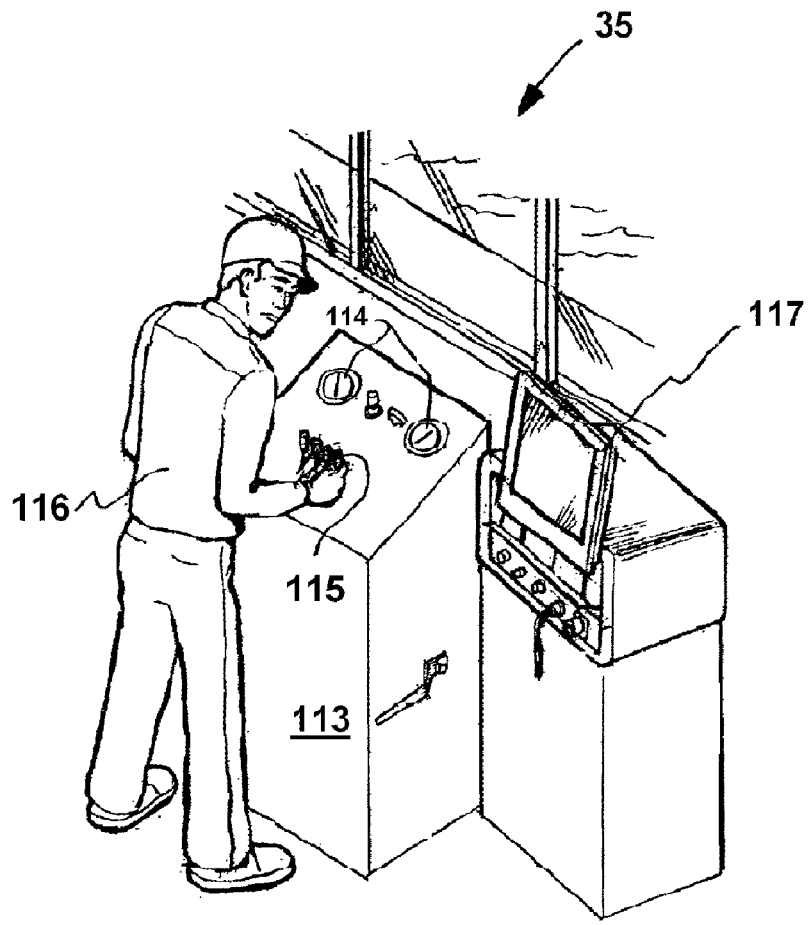
FIG. 19 is a partial perspective view showing a cutting saw operator at a control panel and video monitor.

FIG. 12 shows camera mount 80 for supporting a video camera 81 and light 92. The video camera 81 enables an operator at a remote location such as a hydraulic control panel to view cutting operations when conducted underwater. Camera mount 80 includes a post 82 that can be l-shaped as shown in FIG. 12. Post 82 can be mounted in tube 83 and secured with set screws 78. Camera 81 and light 92 can be remotely operated using cable 79 or other known instrumentation and can be adjusted rotationally in the direction of arrow 93 (or the opposite direction of arrow 93), and also adjusted vertically in the directions of arrows 94 and 95. Camera 81 can provide a video signal for monitor 117 which is being viewed by operator 116 (FIG. 19).

FIG. 13 shows an optional cooling system 84. Cooling system 84 employs a header or flow line 85 fitted with one or more nozzles 86. Each nozzle 86 is capable of directing a water jet 87 to the area being cut as shown in FIG. 13. Water supply conduit 88 can be used to transmit water to header or flow line 85. Water supply conduit 88 attaches to header/flow line 85 at tee fitting 89. Arrow 90 in FIG. 13 illustrates the inflow of water to the cooling system 84 via water supply conduit 88, tee fitting 89 and flow line/header 85. Other cooling fluids beside water can be used such as liquid nitrogen.

FIGS. 15 and 16 show an optional hydraulic clamp, designated by the numeral 100. Clamp 100 provides a receiver 101 that is receptive of feed shaft 20. Receiver 101 can provide one or more openings 102 that enable a bolted connection to be made between receiver 101 and feed shaft 20. Hydraulic clamp 100 provides a body 103 with a hinge 104 that pivotally attaches arm 105 to body 103. Cylinder 106 can be supported at one end on body 103 with a pinned connection 112, the other end of cylinder 106 provides a pushrod 107 that connects to pivoting arm 105 at pinned connection 108. Arrows 109 in FIGS. 15 and 16 illustrate a pivoting movement of arm 105 relative to body 103.

Figure 17:
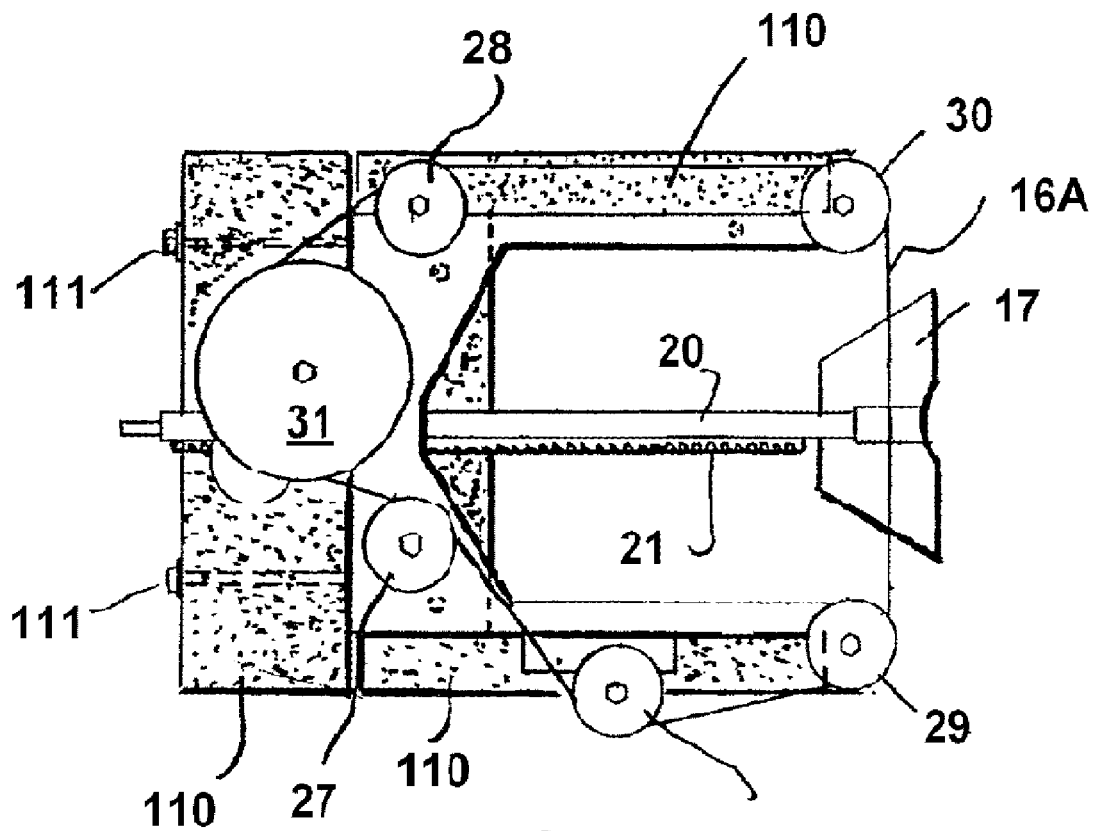
FIG. 17 is a plan view of the cutting saw of FIG. 1 showing floatation modules installed.
Figure 18:
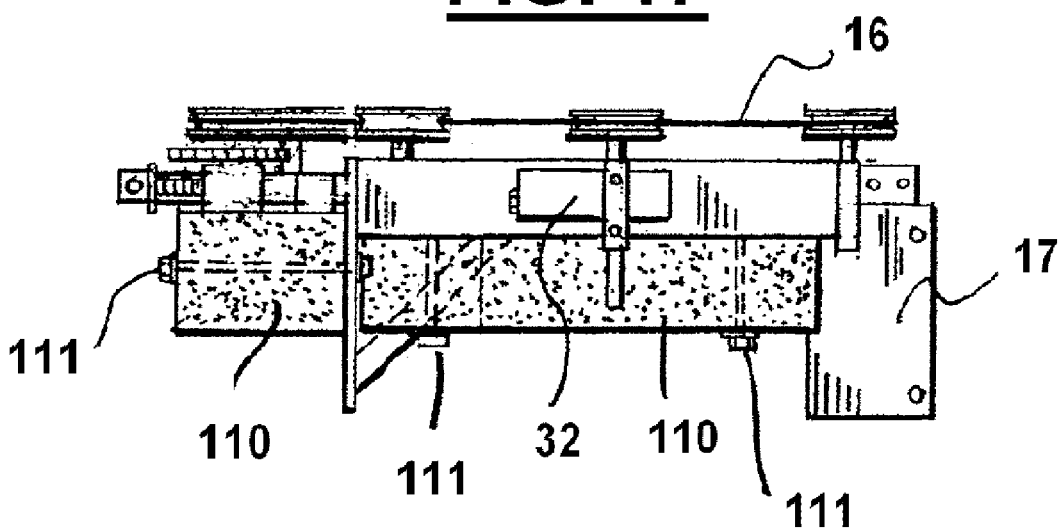
FIG. 18 is a side view of the cutting saw of FIG. 17.

FIGS. 17 and 18 illustrate floatation material 110 that can be bolted to moving portion 23 using bolted connections 111 for example. The floatation material 110 can be any buoyant material such as styrofoam. Floatation material 110 is preferably comprised of a plurality of floatation modules which are detachably connectable to cutting saw 10 such as through bolted connections 111. In one embodiment a kit of a plurality of different sizes of floatation modules can be included to adjust the amount of buoyant force on cutting saw 10.

FIG. 19 illustrates a control panel 113. Control panel 113 can be located on the deck or cabin of vessel 35. Control panel 113 provides instruments 114 and control valves 115 that enable an operator 116 to control operation of the cutting apparatus 10. A monitor 117 communicates with camera 81 for enabling the operator 116 to view cutting operations as well as the overall apparatus 10.

Figure 20:
FIG. 20 is a fragmentary view of one type of diamond cutting wire.
Figure 21:
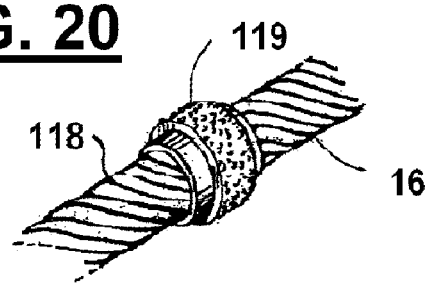
FIG. 21 is a perspective view of the cutting wire of FIG. 20.

FIGS. 20 and 21 show diamond wire 16 in more detail. The diamond wire 16 can provide an elongated wire rope body 121 with spaced apart annular abrasive members 122 mounted thereon as shown in FIGS. 20 and 21. In an alternative embodiment the cutting wire 16 can be a continuous diamond impregnated wire system. Both of these types of cutting wire 16 are conventionally available.

Figure 22:
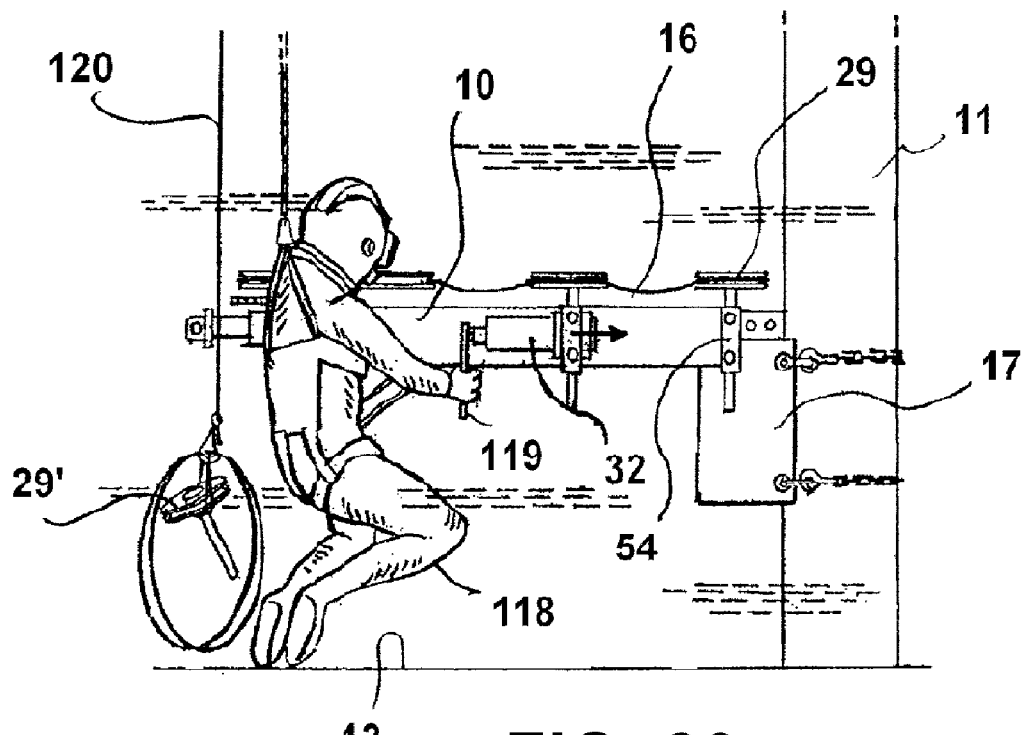
FIG. 22 is a perspective view showing diver adjusting the tensioner and tension on the cutting wire.
Figure 23:
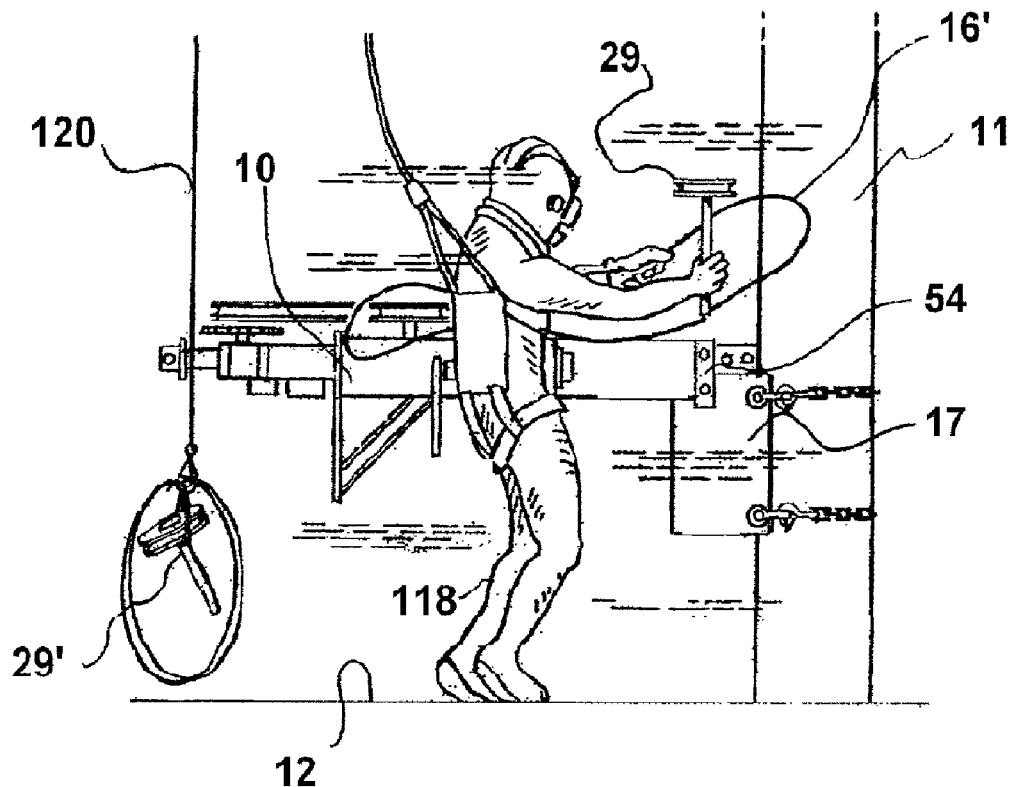
FIG. 23 is a perspective view showing diver replacement of cutting wire and a guide roller.

FIGS. 22 and 23 show adjustment of the tensioner mechanism 32 (FIG. 22) and removal or replacement of a wire 16 and/or of a roller 29. In FIG. 22, a diver 118 uses a wrench 119 to adjust adjustment head 66 of tensioner mechanism 32 and adjust the tension on cutting wire 16. In FIG. 23 diver 118 is shown installing a new wire 16' to replace original cutting wire 16 which may have broken during cutting operations (which replacement step is being done completely underwater). In FIG. 23, diver 118 is shown removing roller guide 29 from tube 54 so that it can be replaced with a spare roller guide 29' that is shown in FIG. 23 attached to a lift line 120 (which replacement step is being done completely underwater).

Typical Method of Subsea Operation

The following includes steps in one embodiment for operating the cutting saw in a subsea environment:

1. Job to be performed can be discussed at length with customer. Details of the job can include tooling placement on vessel 35, shipboard power requirements, water depth, casing sizes to be cut, offshore location, departure dock and safety orientation.

2. Cutting saw 10 and support equipment is prepared and function tested prior to transport to job site.

3. Cutting saw 10 and support equipment is transported to job site such as through customer's supply vessel 35 and to the work location that could be a platform, drilling rig, drill ship, work barge, dive boat, or lift boat.

4. Cutting saw 10 and support equipment is offloaded via work platform crane 37 and placed on the deck in accordance with vessel Captain, tool pusher, and/or Customer representative's instructions.

5. Cutting saw 10 hydraulic control 113 is connected to hydraulic power supply unit.

6. Hoses are used to connect control panel 113 and cutting saw 10 via either a single, 4-hose, umbilical hose bundle or two 2-hose umbilical hose bundles. All umbilical hoses are stored on powered reels for ease of transport, unspooling, and reclaiming hoses from the sea floor.

7. 1" hose is connected to the main drive wheel motor 40 of the cutting saw 10 and ½" (or ¾") hose connected to drive motor for cutting saw's axial feed system (rack and pinion system 20/21).

8. Loop of cutting wire 16 is placed around the alignment wheels or sheaves (10" idler pulley wheels 27-30 and the 24" main wire drive wheel 31). In one embodiment alignment wheels or sheaves 27-30 are painted to be ½ black to allow their rotation to be viewed underwater via a saw mounted camera. When viewing of the rotating wheels substantially appears solid, the wheel speed, and cutting wire 16 speed can be considered adequate for cutting.

9. The tension of the cutting wire loop 16 is applied via the axial tension arm 32 using a wrench (FIG. 9). This adjustment is easily made in a subsea environment should cutting wire replacement be necessary. The cutting saw 10 need not be brought to the surface for changing the cutting wire or for adjusting wire tension.

10. Operators start the hydraulic power unit, adjust appropriate output pressure and gallons per minute flow rate and test the cutting saw 10 operation while the cutting saw 10 is above water (e.g., on the surface of the deck of the ship 35).

11. Once test is deemed good, diver support crews attach sonar positioning beacons, observation camera 81 and light, visual illumination/indication (cylalume glow sticks) and any necessary hand tools for wire changes sub-sea.

12. Deck rigging crews connect the furnished three part sling to the big or small block of the vessel crane 37.

13. Once a diver is in the water and at depth, the vessel crane 37 lowers the cutting saw 10 to the depth and location of the target 11 to be cut. Air bags and/or foam floatation modules 110 can be attached or added to the cutting saw 10 to approximate a neutral buoyancy condition for the cutting saw 10, and to increase the diver's ability to manipulate the cutting saw 10.

14. Diver manually manipulates cutting saw 10 to the desired cut area on target to be cut and provides directions (e.g., oral or verbal such as through a transmitter) to the crane operator to assist in vertically positioning the cutting saw 10 as needed.

15. Once the desired cut position is reached, the diver secures (clamp 17) the cutting saw 10 to the target to be cut (e.g., using manual chain binders or come-along or a hydraulically operated clamp 100 can be used in place of the manual chain binder assembly 17.

16. Once the cutting saw 10 is mounted, the diver removes all attached slings, tooling and handling ropes. The diver ensures that any umbilical and hydraulic lines are clear of all mechanical moving items to ensure unimpeded operation of the cutting saw 10.

17. The diver affixes the crane block with slings and shackles to the item 11 being cut to provide safe holding of the work piece 11' during and after cutting. This step also provides lifting tension on the item to open the cut and aid in the cutting process.

18. The diver returns to a dive bell or to surface prior to initiating saw operation.

19. Once instructed to commence cutting by the Dive Supervisor, the hydraulic power unit is started and adjusted for the appropriate pressure and flow rate.

20. The observation camera 81 and light is turned on to monitor the cut. All cutting is recorded on digital video disk for later assessment.

21. The hydraulic power unit is engaged providing pressure to the system. The operator having verified all parameters starts the cutting machine with the control panel 113.

22. Once a free-spinning drive motor 40 baseline pressure is reached, the diamond wire saw drive motor 40 pressure is monitored for increased pressure indicating that the diamond wire 16 is cutting.

23. An optimum increased pressure on the cutting wire 16 drive motor 40 is approximately 100-300 psi and may be adjusted by incremental movement of the rack and pinion axial wire feed mechanism 20/21.

24. Pressure is monitored throughout the cut. Increased pressure spikes can indicate movement in the target 11 being cut giving the operator 116 an indication of pinching of the diamond wire 16 or a complete drop in pressure, indicating a broken wire 16 or that the cut is complete. Visual indications are provided through the camera 81 and light monitoring system if water clarity allows.

25. If the cut is not complete, a new diamond cutting wire 16' is placed on the 10" idler pulleys 27-30 and tensioned manually by the diver 118 with verbal instruction from a Technician via the Dive Supervisor.

26. All hydraulics are disengaged via the control panel 113 once the cut is complete, or in the event that there is a diamond wire 16 breakage.

27. Once the cut is complete, the vessel 37 crane operator moves the extracted cut piece 11' to the sea floor or returns the piece to the work deck for offloading at a later time.

28. Following a diver survey of the area to ensure no damage to outlying structures or equipment has occurred; the vessel crane 37 block is lowered to the diver and reattached to the diamond wire saw 10 via the supplied three part sling.

29. The diver 118 removes the manual chain clamping system 17 and gives verbal guidance to the crane operator for returning the diamond wire saw 10 to surface.

30. Once the cutting saw 10 is on the vessel 35 work deck, all hydraulic hoses from the hose reel to the saw are disconnected.

31. The cutting saw 10 is thoroughly rinsed with a freshwater solution and all moving components are lubricated.

32. Cutting saw 10 is maintained on standby until further use is needed.

33. All video footage recorded is reviewed for analysis and improvement.

34. A cutting report can be provided to the customer which can include the video footage.

Using Cutting Wire Resistance to Determine Advancement of Cutting Wire

In one embodiment the operator 116 of the saw device can be above water and the cutting saw 10 be below water. In one embodiment the operator can use the resistance on the cutting wire 16 to determine when to advance the cutting wire 16 of the cutting saw 10. In one embodiment the resistance on the cutting wire 16 can be relatively determined based on the back pressure (e.g., hydraulic back pressure) to the driving motor 40 for the cutting wire 16. In one embodiment the cutting process includes the step of advancing the cutting wire 16 a short distance, and watching the resistance on the cutting wire 16 increase and then over time decrease (as the cut on the target 11 is made), and after noting the decrease in wire 16 resistance, again advancing the cutting wire 16 and watching the resistance on the cutting 16 wire again increase. In one embodiment these two steps of advancing the cutting wire 16 a short distance, and watching the resistance on the cutting wire 16 first increase and then decrease before again advancing the cutting wire 16 are repeated a plurality of times until the cut is made through the target 11.

Replacement of Cutting Wire and Alignment Wheels Underwater

In one embodiment the wire 16 can be replaced while the cutting saw 10 is underwater, such as during the middle of a cut and without moving the cutting saw 10 above water (e.g., see FIGS. 22 and 23).

In one embodiment while underwater after a first cutting wire 16 has broken a second cutting wire 16' can be placed on the saw device 10 and properly tensioning without having to first return the saw device 10 to the surface (e.g., see FIGS. 22 and 23). In one embodiment the axial feed wire tensioning system 32 can be used to properly tension the cutting wire 16 while the saw device 10 remains underwater (FIG. 22).

In one embodiment one or more of the alignment wheels or sheaves 27-30 and 32 can be replaced while the saw device 10 is underwater, such as during the middle of a cut and without moving the saw device 10 above water.

Using Both a Push and a Pull Types of Cuts on a Single Cut

In one embodiment the method includes the step of:
(a) starting a cut with a pushing (or pulling) type cut;
(b) before the cut is completed, stopping the cutting wire 16 and at least partially removing the cutting wire 16 from the alignment wheels or sheaves 27-30;
(c) moving the saw device 10 into a different pulling (or pushing) type cut position but without bringing the cutting saw 10 above;
(d) placing cutting wire 16 on the alignment wheels or sheaves 27-30; and
(e) completing the remaining portion of the cut in the other type of cutting mode.

In one embodiment step "c" is completed without repositioning the clamp 17 holding the cutting saw 10 on the target 11.

In one embodiment step "c" is performed by moving the cutting frame 23 to a substantially extended position. In one embodiment the cutting frame 23 is moved to a completely extended position.

In one embodiment step "c" is performed by moving the cutting frame 23 to a substantially retracted position. In one embodiment the cutting frame 23 is moved to a completely retracted position.

In one embodiment the same cutting wire 16 is used during steps "a" and "e."

In one embodiment a different cutting wire 16' is in step "e" as that cutting wire 16 used in step "a".

In one embodiment the cutting wire 16 used in step "a" is a loop which is broken into a wire string with two ends and during step "d" the two ends are reconnected to form a loop.

In one embodiment the cutting wire 16 used in step "a" remains in a loop and is placed around the target 11 being cut before step "d" such as by being run down the top 11" of target 11.

In one embodiment the tensioning mechanism 32 is used to loosen the cutting wire 16 in step "b."

In one embodiment the tensioning mechanism 32 is used to tension the cutting wire 16 in step "d."

In one embodiment the method includes the step of:
(a) starting a cut with a pushing (or pulling) type cut;
(b) before the cut is completed, the first cutting wire 16 breaking;
(c) removing the first cutting wire 16 from the alignment wheels or sheaves 27-30;
(d) without bringing the cutting saw 10 above water installing a second cutting wire 16' on the alignment wheels or sheaves 27-30; and
(e) completing the remaining portion of the cut with the second cutting wire 16'.

In one embodiment the tensioning mechanism 32 is used to loosen the first cutting wire 16 in step "c."

In one embodiment the tensioning mechanism is used to tension the second cutting wire 16' in step "d."

In one embodiment the method includes the step of vertically adjusting at least one of the alignment wheels or sheaves (27-30 and/or 32) while the cutting saw 10 remains underwater.

The following is a list of Reference numerals which are used in this application.

LIST OF REFERENCE NUMERALS

| Reference Number | Description |
| --- | --- |
| 10 | cutting apparatus |
| 11 | target |
| 12 | seabed |
| 13 | frame |
| 14 | shackle |
| 15 | lift cable |
| 16 | diamond wire |
| 16A | cutting point of diamond wire |
| 17 | mounting clamp |
| 18 | cable/chain attachment |
| 19 | cable/chain attachment |
| 20 | feed shaft |
| 21 | toothed rack |
| 22 | receiver |
| 23 | moving portion |
| 24 | arm |
| 25 | arm |
| 26 | open end |
| 27 | sheave/roller guide |
| 28 | sheave/roller guide |
| 29 | sheave/roller guide |
| 30 | sheave/roller guide |
| 31 | drive roller |
| 32 | tensioner mechanism |
| 33 | hydraulic fluid supply |
| 34 | hydraulic control unit |
| 35 | support vessel |
| 36 | water surface |
| 37 | crane |
| 38 | arrow |
| 39 | cut |

-continued

LIST OF REFERENCE NUMERALS

| Reference Number | Description |
|---|---|
| 40 | motor drive |
| 41 | hydraulic line |
| 42 | hydraulic line |
| 43 | drive belt |
| 44 | motor drive |
| 45 | hydraulic line |
| 46 | hydraulic line |
| 47 | smaller gear |
| 48 | larger gear |
| 49 | pinion |
| 50 | arrow |
| 51 | section |
| 52 | section |
| 53 | shaft |
| 54 | tube |
| 55 | set screw |
| 56 | arrow |
| 57 | arrow |
| 58 | arrow |
| 59 | arrow |
| 60 | transverse section |
| 61 | sleeve |
| 62 | arrow |
| 63 | web |
| 64 | flange |
| 65 | end plate |
| 66 | adjustment head |
| 67 | plate opening |
| 68 | threaded rod |
| 69 | nut |
| 70 | intervally threaded opening |
| 71 | bearing/slide |
| 72 | arrow |
| 73 | curved arrow |
| 74 | roller guide |
| 75 | annular grove |
| 76 | annular flange/stop |
| 77 | arrow |
| 78 | set screw |
| 79 | cable |
| 80 | camera mount |
| 81 | camera |
| 82 | post |
| 83 | tube |
| 84 | cooling system |
| 85 | flow line/header |
| 86 | nozzle |
| 87 | water jet |
| 88 | water supply conduit |
| 89 | tee fitting |
| 90 | arrow |
| 92 | light |
| 93 | arrow |
| 94 | arrow |
| 95 | arrow |
| 100 | hydraulic clamp |
| 101 | receiver |
| 102 | opening |
| 103 | body |
| 104 | hinge |
| 105 | pivoting arm |
| 106 | cylinder |
| 107 | pushrod |
| 108 | pinned connection |
| 109 | arrow |
| 110 | floatation material |
| 111 | bolted connection |
| 112 | pinned connection |
| 113 | control panel |
| 114 | instrument |
| 115 | control valve/lever |
| 116 | operator |
| 117 | monitor |
| 118 | diver |
| 119 | wrench |
| 120 | lift line |

-continued

LIST OF REFERENCE NUMERALS

| Reference Number | Description |
|---|---|
| 121 | wire rope body |
| 122 | abrasive member |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A wire saw apparatus comprising:
a) a frame that includes a clamp configured to attach to a target that is to be cut and a moving portion mounting to the clamp for movement relative to the clamp;
b) an elongated linear beam mounted to the clamp and extending away from the clamp and target;
c) the moving portion including a pair of arms disposed on opposing sides of the beam, an open end positioned near the clamp and a transverse bar that connects the arms opposite the open end;
d) the moving portion having a powered driver operably connected to the linear beam which driver effects linear movement of the moving portion of the frame along the beam;
e) a plurality of roller guides on the moving portion of the frame including at least one roller guide mounted at the free end of each arm;
f) a drive roller on the moving portion, the drive roller being rotatable by a powered motor drive; and
g) a diamond wire wound upon the drive roller and guide rollers so that when the drive roller is rotated, the diamond wire travels around the moving portion and from one roller to another roller.

2. The wire saw apparatus of claim 1, wherein the powered driver travels with the moving portion.

3. The wire saw apparatus of claim 1, further comprising a tensioning mechanism that enables adjustment of the tension of the diamond wire.

4. The wire saw apparatus of claim 1, wherein the diamond wire travels at a speed of between about 20 and 30 feet per second.

5. The wire saw apparatus of claim 1, wherein at least one of the rollers is marked with different patterns so that rotation of the rollers is visible even via underwater camera and remote monitor.

6. The wire saw apparatus of claim 1, wherein the clamp is secured to the target with a hydraulic clamping mechanism.

7. The wire saw apparatus of claim 1, wherein the arm free ends are connected with a section of wire that cuts through the target as the moving portion of the frame travels along the beam and towards the clamp.

8. The wire saw apparatus of claim 1, wherein the guide rollers on the arm free ends are connected with a section of wire that extends across the open end of the moving portion.

9. The wire saw apparatus of claim 1, wherein the moving portion carries a camera and light mount.

10. The wire saw apparatus of claim 1, wherein the guide rollers are removably attached to the moving portion of the frame.

11. The wire saw apparatus of claim 1, wherein rollers and wire define a cutting plane and the linear beam includes a toothed rack and is below the cutting plane and a drive motor is operably connected to the toothed rack and also positioned below the cutting plane.

12. The wire saw apparatus of claim 1, wherein the arms are spaced apart a distance that defines the maximum thickness of a target that can be cut.

13. The wire saw apparatus of claim 1, wherein the arm free ends and transverse bar are spaced apart a distance that defines the maximum thickness of a target that can be cut.

14. A wire saw apparatus comprising:
   a) a clamp configured to attach to a target that is to be cut;
   b) an elongated linear beam mounted to the clamp and extending away from the clamp and target;
   c) a moving frame mounted on the elongated beam and being movable along the beam, the frame including a pair of arms disposed on opposing sides of the beam, an open end positioned near the clamp and a transverse bar that connects the arms opposite the open end;
   d) a motor operably connected to the linear beam which motor effects linear movement of the moving frame along the beam;
   e) a plurality of roller guides on the moving portion of the frame including at least one roller guide mounted at the free end of each arm;
   f) a drive roller on the moving portion, the drive roller being rotatable by a second motor drive;
   g) a diamond wire wound upon the drive roller and guide rollers so that when the drive roller is rotated with the second motor drive, the diamond wire travels around the moving portion and from one roller to another roller.

15. The wire saw apparatus of claim 14, wherein the drive roller has a diameter that is more than two times any of the guide rollers.

16. The wire saw apparatus of claim 14, wherein the diamond wire travels at a speed of between about 20 and 30 feet per second.

17. A wire saw apparatus for cutting underwater targets, comprising:
   a) a frame that includes a fixed mount and a traveling frame section;
   b) the mount providing a bracket and a clamp that enables a connection to be made between the bracket and the target;
   c) the mount including an elongated bar that is attached to the bracket and extending away from the bracket and the target;
   d) a first motor drive on the traveling frame section having a pinion gear that engages the rack;
   e) the traveling frame section having a transverse beam and a pair of opposed generally parallel arms, each having an arm end and an open throat in between the arm ends;
   f) a plurality of roller guides on the frame;
   g) a diamond wire belt supported by the roller guides, the belt extending along each arm, the transverse beam and the throat; and
   h) a second motor drive that drives one of the roller guides and the wire belt.

18. A method of cutting an underwater target, comprising the steps of:
   a) lowering a cutting apparatus to a position that is next to an underwater target to be cut;
   b) attaching the cutting apparatus to the target with a clamping mechanism;
   c) wherein in step "b" the cutting apparatus provides a frame that includes a clamp configured to attach to a target that is to be cut and a moving portion mounting to the clamp for movement relative to the clamp, an elongated beam mounted to the clamp and extending away from the clamp and target, the moving portion includes a pair of arms disposed on opposing sides of the beam and an open end positioned near the clamp and a transverse section that connects the arms opposite the open end and wherein a diamond wire is supported for travel upon the frame, the wire connected to a plurality of rollers including at least one powered drive roller that moves the wire;
   d) advancing the moving portion toward the target while the diamond wire is traveling upon the rollers;
   e) wherein in step "d" a driver engages the elongated beam and advances the moving portion.

19. The method of claim 18, wherein the cutting mechanism is operated remotely from a vessel using a control panel.

20. The method of claim 19, wherein remote operation includes monitoring the cutting with an underwater camera that transmits a signal to a monitor on the vessel.

* * * * *